(12) United States Patent
Choi et al.

(10) Patent No.: US 11,206,674 B2
(45) Date of Patent: Dec. 21, 2021

(54) METHOD AND APPARATUS FOR ALLOCATING DYNAMIC RESOURCES OF INTEGRATED ACCESS AND BACKHAUL NODES IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 16/665,817

(22) Filed: Oct. 28, 2019

(65) Prior Publication Data

US 2020/0146025 A1    May 7, 2020

(30) Foreign Application Priority Data

Nov. 1, 2018    (KR) .......................... 10-2018-0133131

(51) Int. Cl.
| | |
|---|---|
| *H04W 56/00* | (2009.01) |
| *H04W 72/10* | (2009.01) |
| *H04W 88/18* | (2009.01) |
| *H04W 88/14* | (2009.01) |
| *H04W 72/12* | (2009.01) |

(52) U.S. Cl.
CPC ....... *H04W 72/10* (2013.01); *H04W 72/1263* (2013.01); *H04W 88/14* (2013.01); *H04W 88/184* (2013.01)

(58) Field of Classification Search
CPC ............. H04W 72/10; H04W 72/1263; H04W 88/14; H04W 88/184
USPC ......................................................... 370/329
See application file for complete search history.

(56) References Cited

U.S. PATENT DOCUMENTS

2017/0005913 A1 *  1/2017  Hampel ................ H04L 45/245
2018/0092139 A1    3/2018  Novlan et al.

OTHER PUBLICATIONS

International Search Report dated Feb. 7, 2020, issued in International Application No. PCT/KR2019/014302.
(Continued)

*Primary Examiner* — Sai Ming Chan
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure discloses a method and an apparatus for allocating resources of an IAB node.

20 Claims, 9 Drawing Sheets

(56) References Cited

OTHER PUBLICATIONS

Qualcomm Incorporated, 'IAB Resource Management', R1-1809444, 3GPP TSG RAN WG1 Meeting #94, Aug. 17, 2018.
Huawei et al., 'Physical layer design for NR IAB', R1-1810130, 3GPP TSG RAN WG1 Meeting #94bis, Sep. 29, 2018.
Catt, 'NR Physical Layer design for IAB backhaul link', R1-1808398, 3GPP TSG RAN WG1 Meeting #94, Aug. 11, 2018.
Ericsson, 'Updated summary of 7.2.3.1 Enhancements to support NR backhaul links', R1-1812042, 3GPP TSG RAN WG1 Meeting #94bis, Oct. 12, 2018.

* cited by examiner

METHOD AND APPARATUS FOR ALLOCATING DYNAMIC RESOURCES OF INTEGRATED ACCESS AND BACKHAUL NODES IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0133131, filed on Nov. 1, 2018, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for allocating dynamic resources of integrated access and backhaul (IAB) nodes.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, large scale antenna, and other techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid frequency-shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances, and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described big data processing technology may also be considered to be as an example of convergence between the 5G technology and the IoT technology.

Recently, various research for utilizing IAB technology has been made, and there has been a need for improvement of resource allocation of IAB nodes.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide schemes for addressing a problem in the case where transmission and reception directions of a distributed unit (DU) and a mobile termination (MT) do not coincide with each other in an integrated access and backhaul (IAB) node when an IAB is operated.

Additional aspects will be set forth in part in the description which follows and, in part, will be apparent from the description, or may be learned by practice of the presented embodiments.

In accordance with an aspect of the disclosure, a method performed by an IAB node including a DU and an MT in a wireless communication system is provided. The method includes receiving, by the DU from a base station including a central unit (CU), a message allocating at least one resource to be used by the IAB node, identifying whether a transmission or a reception of the DU is scheduled for the at least one resource, and performing, by the DU, the transmission or the reception of the DU by using the at least one resource.

In accordance with another aspect of the disclosure, an IAB node including a DU and an MT in a wireless communication system is provided. The IAB node includes a transceiver configured to transmit and receive a signal, and at least one processor configured to receive, by the DU from a base station including a central unit (CU), a message allocating at least one resource to be used by the IAB node, identify whether a transmission or a reception of the DU is scheduled for the at least one resource, and perform, by the DU, the transmission or the reception of the DU by using the at least one resource.

In accordance with another aspect of the disclosure, a method performed by a base station including a CU in a wireless communication system is provided. The method includes transmitting, to an IAB node including a DU and an MT, a message allocating at least one resource to be used by the IAB node, wherein a transmission or a reception of the DU is performed by using the at least one resource, in case that the transmission or the reception of the DU is scheduled for the at least one resource.

In accordance with another aspect of the disclosure, a base station including a CU in a wireless communication system is provided. The base station includes a transceiver configured to transmit and receive a signal, and at least one processor configured to transmit, to an IAB node including a DU and an MT, a message allocating at least one resource to be used by the IAB node, wherein a transmission or a reception of the DU is performed by using the at least one resource, in case that the transmission or the reception of the DU is scheduled for the at least one resource.

According to the various embodiments of the disclosure, in the case where the data transmission and reception directions of the DU and the MT do not coincide with each other in the IAB node, the operation of the IAB node is defined in accordance with the unidirectional transmission and reception characteristics, and thus the problems that may occur in the IAB node can be prevented from occurring.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
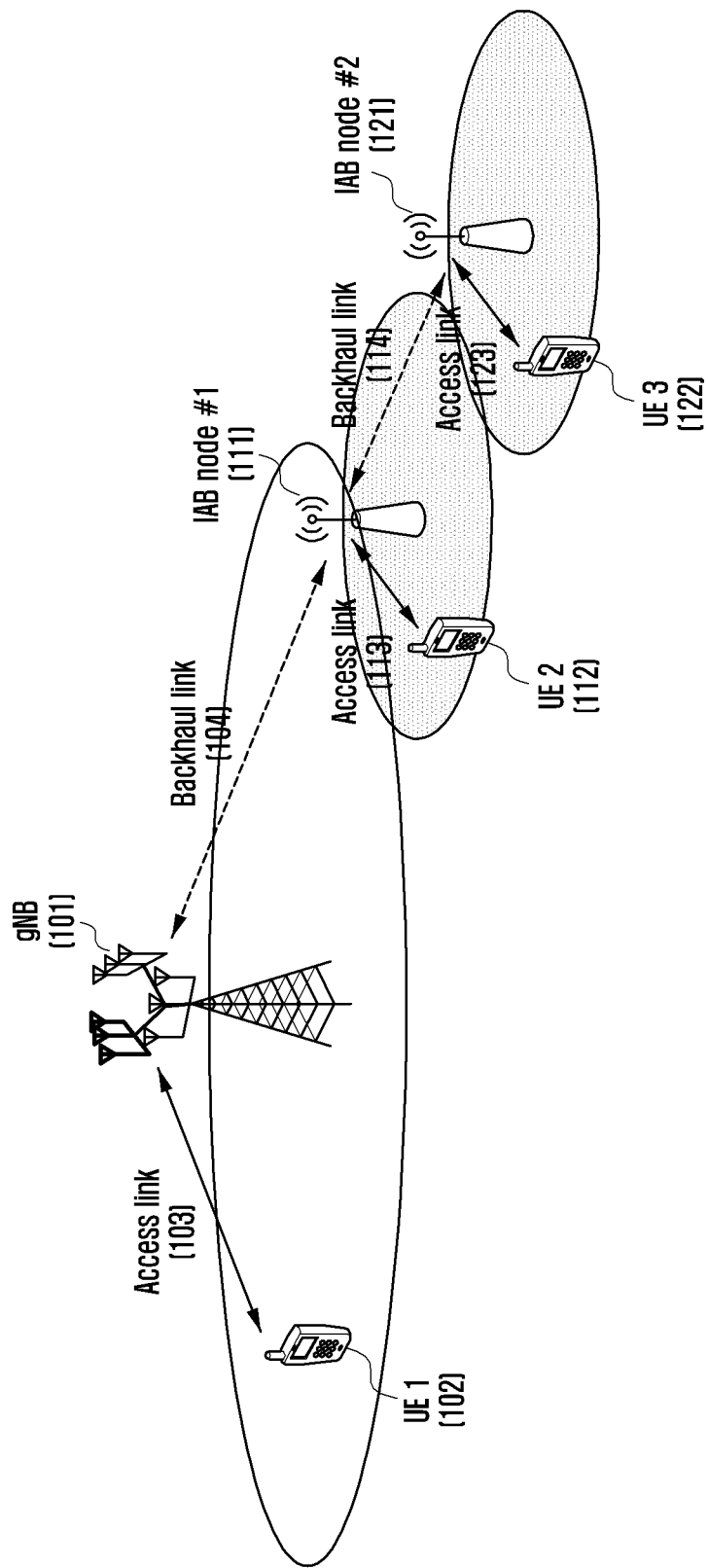
FIG. 1 is a diagram illustrating a communication system in which an integrated access and backhaul (IAB) is operated according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In explaining embodiments in the description, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, refers to, but is not limited to, a software or hardware component, such as a field programmable gate array (FPGA) or an application-specific integrated circuit (ASIC), which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPUs) in a device or a security multimedia card.

A wireless communication system was initially developed for the purpose of providing a voice-oriented service, but has been expanded to, for example, a broadband wireless communication system that provides a high-speed and high-quality packet data service like the communication standards, such as 3rd Generation Partnership Project (3GPP) high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), and IEEE 802.16e.

In an LTE system that is a representative example of a broadband wireless communication system, the downlink (DL) adopts an orthogonal frequency division multiplexing (OFDM) scheme, and the uplink (UL) adopts single carrier frequency division multiple access (SC-FDMA) scheme. The uplink refers to a radio link in which a terminal (or user equipment (UE)) or a mobile station (MS) transmits data or a control signal to a base station (BS) (or eNode B), and the downlink means a radio link in which the base station transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

As the post LTE communication system, the 5G communication system should support services that simultaneously satisfy various requirements of users and service providers since it is required to freely reflect the various requirements. Services being considered for the 5G communication system include enhanced mobile broadband (eMBB), massive machine type communication (mMTC), and ultra-reliability low-latency communication (URLLC).

The eMBB aims to provide an improved data rate as compared to the data rate supported by the existing LTE, LTE-A, or LTE-Pro. For example, in the 5G communication system, the eMBB should provide, from the viewpoint of one base station, the maximum transmission rate of 20 Gbps in the downlink, and the maximum transmission rate of 10 Gbps in the uplink. Further, the 5G communication system should provide the maximum transmission rate and a user perceived data rate of an increased terminal. To satisfy such requirements, it is required to improve various transmission/reception technologies including improved multi input multi output (MIMO) transmission technology. Further, the current LTE transmits signals using the maximum 20 MHz transmission bandwidth in the 2 GHz band, whereas the 5G communication system uses a wider frequency bandwidth than 20 MHz in the frequency band of 3 to 6 GHz or 6 GHz or more, and thus can satisfy the data rate required in the 5G communication system.

At the same time, the mMTC is under consideration to support application services, such as the Internet of things (IoT), in the 5G communication system. In order to efficiently provide the Internet of things, the mMTC requires massive terminal connection support in a cell, terminal coverage improvement, improved battery time, and terminal cost reduction. Since the Internet of things is attached to several sensors and various devices to provide communication functions, it should support a large number of terminals (e.g., 1,000,000 terminals/km$^2$) in the cell. Further, since there is a high possibility that the terminal supporting the mMTC is located in a shaded area that the cell is unable to cover, such as a basement of a building, due to the service characteristics, a wider coverage is required as compared with other services provided in the 5G communication system. The terminal supporting the mMTC should be inexpensive, and requires very long battery life time, such as 10 to 15 years, since it is difficult to frequently replace a battery of the terminal.

Last, the URLLC is a cellular based wireless communication service used for a specific purpose (mission-critical). For example, services used for remote control of a robot or machinery, industrial automation, unmanned aerial vehicle, remote health care, and emergency alert may be considered. Accordingly, the communication provided by the URLLC should provide very low latency and very high reliability. For example, a service supporting the URLLC should satisfy air interface latency that is shorter than 0.5 ms, and requires a packet error rate of $10^{-5}$ or less at the same time. Accordingly, for the service supporting the URLLC, the 5G system should provide a transmit time interval (TTI) that is smaller than that of other services, and also requires a design to allocate wide resources in the frequency band in order to secure reliability of a communication link.

The three kinds of 5G services, that is, the eMBB, URLLC, and mMTC, may be multiplexed in one system to be transmitted. In this case, in order to satisfy different requirements of the respective services, different transmission/reception techniques and transmission/reception parameters may be used among the services.

In the 5G system, coverage may be limited due to propagation path attenuation in a case where a base station transmits or receives data to or from a terminal in the band of 6 GHz or more, in particular, in mmWave band. A problem caused by the coverage limit may be addressed through close deployment of a plurality of relays (or relay nodes) between propagation paths of the base station and the terminal. However, cost problems become severe in installing optical cables for backhaul connections between the relays. Accordingly, instead of installing the optical cables between the relays, broadband radio frequency resources that are available in the mmWave band may be used to transmit and receive backhaul data between the relays to address the cost problem in installing the optical cables and to use the mmWave band more efficiently.

As described above, a technology to transmit or receive backhaul data to or from a base station using the mmWave and to finally transmit or receive access data to or from a terminal through a plurality of relays is called an integrated access and backhaul (IAB). A relay node that transmits or receives data to or from the base station through a wireless backhaul is called an IAB node. In this case, the base station is composed of a central unit (CU) and a distributed unit (DU), and the IAB node is composed of a distributed unit (DU) and a mobile termination (MT). The CU manages DUs of all IAB nodes connected to the base station through a multi-hop.

The IAB node uses the same frequency band when it receives backhaul data from the base station and transmits access data to the terminal and when it receives access data from the terminal and transmits backhaul data to the base station. Due to such characteristics of the IAB node, the IAB node has unidirectional transmission/reception characteristics (i.e., half duplex constraint). Accordingly, as a method for reducing a transmission/reception delay due to the unidirectional transmission/reception characteristics of the IAB node, the IAB node, during reception by the IAB node, may perform FDM and/or SDM with respect to backhaul data (downlink data from a DU of a parent IAB node to an MT of the IAB node and uplink data from an MT of a child IAB node to a DU of the IAB node) and access data from the terminal (uplink data from the terminal to the IAB node).

Further, even during transmission by the IAB node, the IAB node may perform FDM and/or SDM with respect to backhaul data (uplink data from the MT of the IAB node to the DU of the parent IAB node and downlink data from the DU of the IAB node to the MT of the child IAB node) and access data to the terminal (downlink data from the IAB node to the terminal). In this case, if the data transmission/reception directions of the DU and the MT in the IAB node do not coincide with each other, it is required to define the operation of the IAB node in accordance with the unidirectional transmission/reception characteristics. Accordingly, in the disclosure, an operation of the IAB node is provided.

FIG. 1 is a diagram illustrating a communication system in which an IAB is operated according to an embodiment of the disclosure.

Referring to FIG. 1, a next generation node B (gNB) 101 is an ordinary base station (e.g., eNB or gNB), and in the disclosure, it is called a base station or a donor base station. An IAB node #1 111 and an IAB node #2 121 are IAB nodes for transmitting and receiving a backhaul link in the mmWave band. A terminal (UE) 1 102 transmits and receives access data with the gNB 101 through an access link 103. The IAB node #1 111 transmits and receives backhaul data with the gNB 101 through a backhaul link 104. A UE 2 112 transmits and receives the access data with the IAB node #1 111 through an access link 113. The IAB node #2 121 transmits and receives the backhaul data with the IAB node #1 111 through a backhaul link 114. Accordingly, the IAB node #1 111 is a higher IAB node of the IAB node #2 121, and it is also called a parent IAB node. The IAB node #2 121 is a lower IAB node of the IAB node #1 111, and it is called a child IAB node. A UE 3 122 transmits and receives the access data with the IAB node #2 121 through an access link 123.

Next, measurement of the IAB node of the UE or donor gNB will be described.

The UE 2 112 or the UE 3 122 may require coordination between a donor gNB and IAB nodes for the purpose of performing measurement of a neighboring donor gNB or IAB node that is not a serving IAB node. That is, the donor gNB may minimize resource waste for the UE to perform measurement of a neighboring IAB node or IAB base station through coincidence of measurement resources of the IAB nodes having an even hop order or through coincidence of measurement resources of the IAB nodes having an odd hop order. The UE may receive, from the serving IAB node or base station, a configuration to measure a synchronization signal block (SSB)/physical broadcast channel (PBCH) or a channel state information reference signal (CSI-RS) for measurement of a neighboring IAB node through an upper signal. If the UE is configured to perform measurement of a neighboring base station through the SSB/PBCH, the UE may configure at least two SSB/PBCH measurement timing configurations (SMTCs) per frequency for the measurement resources of the IAB nodes having an even hop order or the measurement resources of the IAB nodes having an odd hop order. The UE having received the configuration may perform the measurement of the IAB nodes having the even hop order in one SMTC, and may perform the measurement of the IAB nodes having the odd hop order in another SMTC.

Next, measurement of the IAB node or other IAB nodes of donor gNBs will be described.

One IAB node may require coordination between the donor gNB and IAB nodes for the purpose of performing the measurement of another neighboring donor gNB or IAB node. That is, the donor gNB may minimize the resource waste for the one IAB node to perform the measurement of the neighboring IAB node or IAB base station through coincidence of the measurement resources of the IAB nodes having an even hop order or through coincidence of the measurement resources of the IAB nodes having an odd hop order. The one IAB node may receive, from the serving IAB node or base station, a configuration to measure the SSB/PBCH or CSI-RS for measurement of the neighboring IAB node through the upper signal. If the IAB node is configured to perform measurement of the neighboring base station through the SSB/PBCH, the IAB node may configure at least two SSB/PBCH measurement timing configurations (SMTCs) per frequency for the measurement resources of the IAB nodes having an even hop order or the measurement resources of the IAB nodes having an odd hop order. The IAB node having received the configuration may perform the measurement of the IAB nodes having the even hop order in one SMTC, and it may perform the measurement of the IAB nodes having the odd hop order in another SMTC.

Next, in the IAB technology proposed in the disclosure, multiplexing of a backhaul link between the base station and the IAB node or between the IAB node and the IAB node and an access link between the base station and the UE or between the IAB node and the UE in radio resources will be described with reference to FIGS. 2, 3, and 4.

Figure 2:
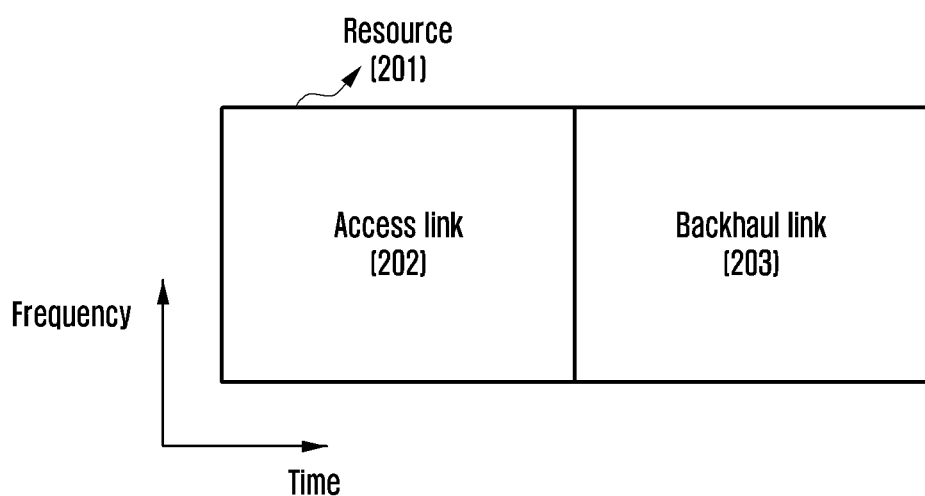
FIG. 2 is a diagram schematically illustrating multiplexing in time and frequency domains between an access link and a backhaul link in an IAB according to an embodiment of the disclosure.
Figure 2:
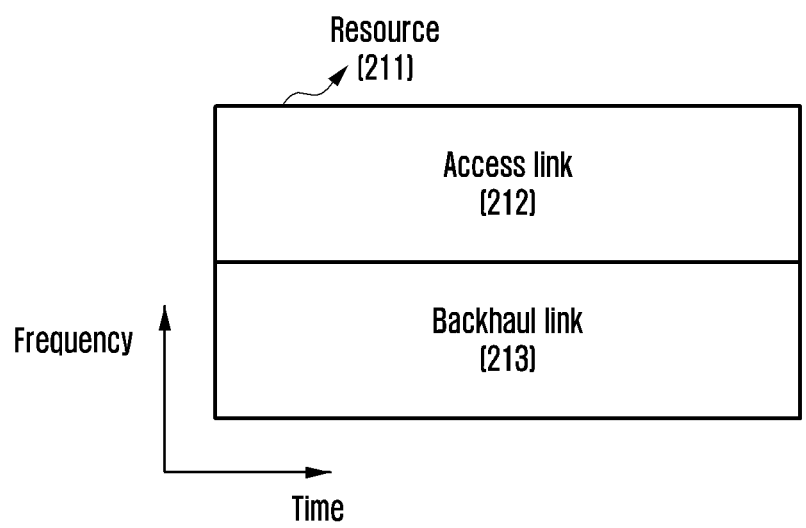

FIG. 2 is a diagram schematically illustrating multiplexing in time and frequency domains between an access link and a backhaul link in an IAB node according to an embodiment of the disclosure.

Referring to FIG. 2, an upper end portion illustrates multiplexing in a time domain between the access link and the backhaul link in the IAB node. A lower end portion illustrates multiplexing in a frequency domain between the access link and the backhaul link in the IAB node.

In a radio resource 201 illustrated in the upper end portion of FIG. 2, a backhaul link 203 between a base station and an IAB node or between IAB nodes and an access link 202 between the base station and a terminal or between the IAB node and the terminal are time-domain-multiplexed (TDM). Accordingly, data is not transmitted or received between the base station and the IAB nodes in a time domain in which the base station or the IAB node transmits or receives data to or from the terminal, and the base station or the IAB node does not transmit or receive data to or from the terminal in a time domain in which data is transmitted or received between the base station and the IAB nodes.

In a radio resource 211 illustrated in the lower end portion of FIG. 2, a backhaul link 213 between the base station and the IAB node or between IAB nodes and an access link 212 between the base station and the terminal or between the IAB node and the terminal are frequency-domain-multiplexed (FDM). Accordingly, data can be transmitted or received between the base station and the IAB nodes in a time domain in which the base station or the IAB node transmits or receives data to or from the terminal, but only data transmission in the same direction is possible due to unidirectional transmission/reception characteristics of the IAB nodes. That is, in the time domain in which one IAB node receives data from the terminal, it is only possible that the IAB node receives backhaul data from another IAB node or the base station. Further, in the time domain in which one IAB node transmits data to the terminal, it is only possible that the IAB node transmits the backhaul data to another IAB node or the base station.

Although only the TDM and the FDM have been described in FIG. 2, it is possible to perform spatial domain multiplexing (SDM) between the access link and the backhaul link. Accordingly, although it is possible that the access link and the backhaul link are transmitted or received at the same time through the SDM, like the FDM in the lower end portion of FIG. 2, only data transmission in the same direction is possible even in the SDM due to the unidirectional transmission/reception characteristics of the IAB nodes. That is, in the time domain in which one IAB node receives data from the terminal, it is only possible that the IAB node receives the backhaul data from another IAB node or the base station. Further, in the time domain in which one IAB node transmits data to the terminal, it is only possible that the IAB node transmits the backhaul data to another IAB node or the base station.

An indication of what multiplexing technique among the TDM, FDM, and SDM is to be used may be received from the base station or higher IAB nodes through system information or a radio resource control (RRC) signal by transmitting capability information for the multiplexing technique to the base station or higher IAB nodes when the IAB node initially accesses the corresponding base station or the higher IAB node. After the initial access, the IAB node may receive the same from the base station or the higher IAB nodes through a backhaul link. The capability for the multiplexing technique may support TDM.

Figure 3:
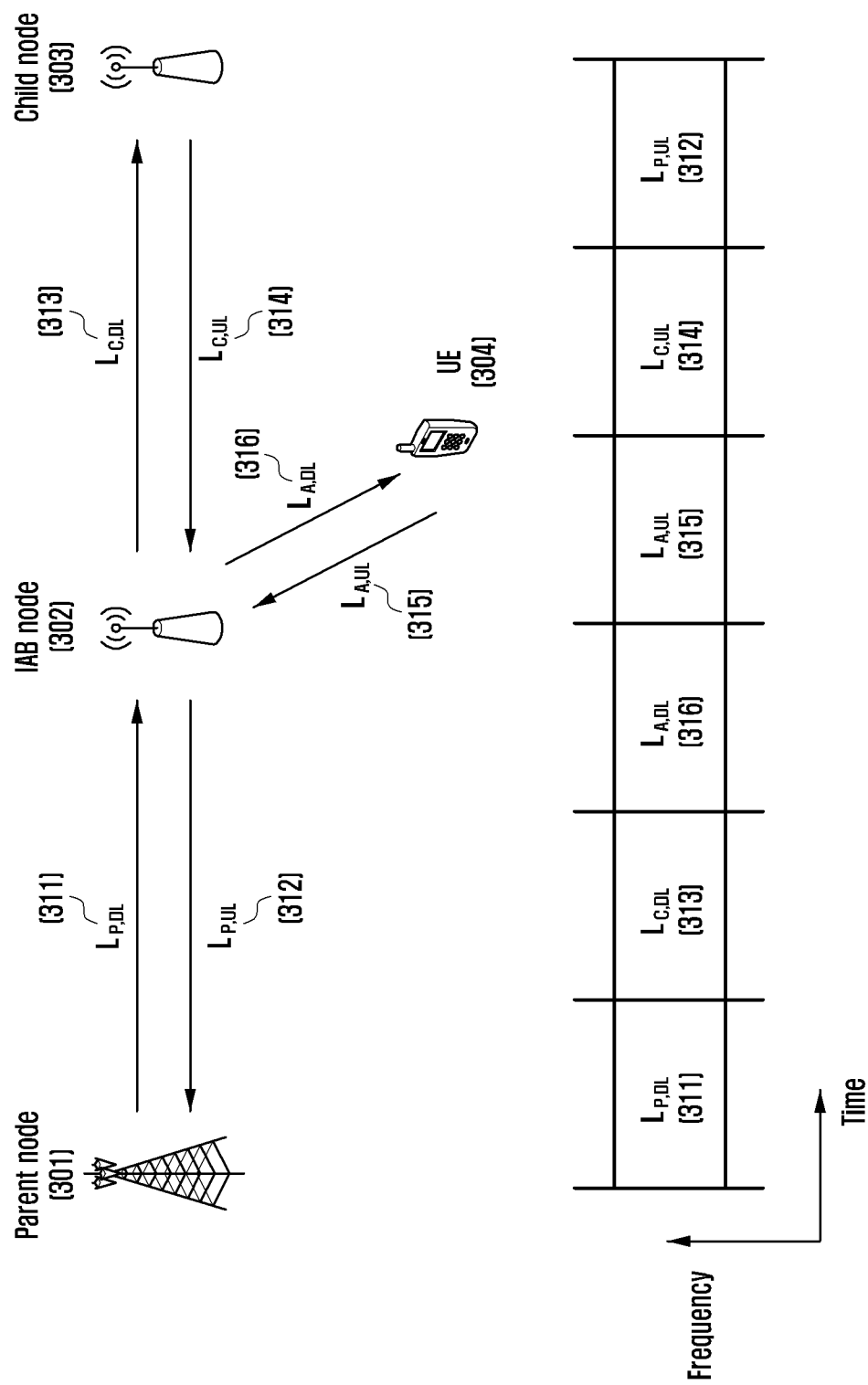
FIG. 3 is a diagram illustrating multiplexing in a time domain between an access link and a backhaul link in an IAB according to an embodiment of the disclosure.

FIG. 3 is a diagram illustrating multiplexing in a time domain between an access link and a backhaul link in an IAB according to an embodiment of the disclosure.

Referring to FIG. 3, in an upper end portion, a process is illustrated in which an IAB node 302 communicates with a parent node 301, a child IAB node 303, and a terminal (UE) 304. Links between respective nodes will be described in more detail. The parent node 301 transmits a backhaul downlink signal to the IAB node 302 in a backhaul downlink $L_{P,\ DL}$ 311, and the IAB node 302 transmits a backhaul uplink signal to the parent node 301 in a backhaul uplink $L_{P,\ UL}$ 312. The IAB node 302 transmits an access downlink signal to the terminal 304 in an access downlink $L_{A,\ DL}$ 316, and the terminal 304 transmits an access uplink signal to the IAB node 302 in an access uplink $L_{A,\ UL}$ 315. The IAB node 302 transmits a backhaul downlink signal to the child IAB node 303 in a backhaul downlink $L_{C,\ DL}$ 313, and the child IAB node 303 transmits a backhaul uplink signal to the IAB node 302 in a backhaul uplink $L_{C,\ UL}$ 314. In the notation, P refers to a backhaul link with the parent, A refers to an access link with the terminal, and C refers to a backhaul link with the child.

Such a link relationship has been described based on the IAB node 302, and from the viewpoint of the child IAB node 303, the parent node may be the IAB node 302, and another child IAB node may exist in a lower layer of the child IAB node 303. Further, from the viewpoint of the parent node 301, the child node may be the IAB node 302, and another parent IAB node may exist in a higher layer of the parent node 301.

As described above, the signals include data and control information, a channel for transmitting the data and control information, a reference signal required to decode the data and control information, or reference signals for knowing the channel information.

In a lower end portion of FIG. 3, a process is illustrated in which all the links are multiplexed in the time domain. In the drawing, the backhaul downlink ($L_{P,\ DL}$) 311, the backhaul downlink ($L_{C,\ DL}$) 313, the access downlink ($L_{A,\ DL}$) 316, the access uplink ($L_{A,\ UL}$) 315, the backhaul uplink ($L_{C,\ UL}$) 314, and the backhaul uplink ($L_{P,\ UL}$) 312 are multiplexed in the order of time. The order of the links provided in the drawing is exemplary, and any order may be applied with no relation.

Because the above-described links are multiplexed in the time domain in the order of time, it takes the longest time in transmitting the signal from the parent node 301 to the child IAB node 303 through the IAB node 302, and also to the terminal 304. Accordingly, as a method for reducing latency in the case of transmitting the signal from the parent node 301 finally to the terminal 304, a method for transmitting the backhaul links or the backhaul link and the access links at the same time may be considered through multiplexing of the above-described links in a frequency domain or in a space domain.

Figure 4:
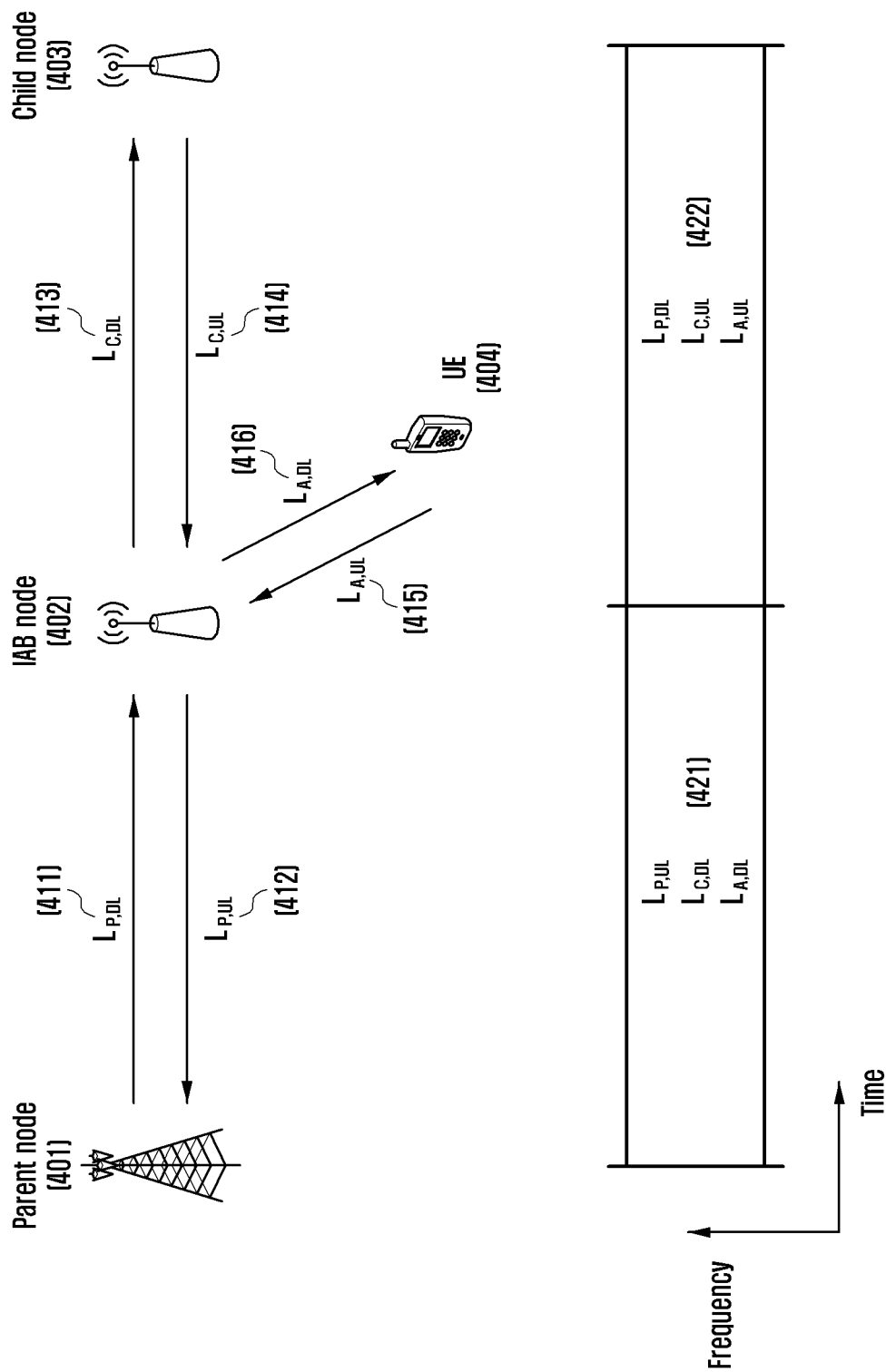
FIG. 4 is a diagram illustrating multiplexing in frequency and space domains between an access link and a backhaul link in an IAB according to an embodiment of the disclosure.

FIG. 4 is a diagram illustrating multiplexing in frequency and space domains between an access link and a backhaul link in an IAB according to an embodiment of the disclosure.

Referring to FIG. 4, a method for reducing latency through multiplexing backhaul links or a backhaul link and access links in a frequency domain or in a space domain will be described.

In an upper end portion of FIG. 4, a process is illustrated in which an IAB node 402 communicates with a parent node

401, a child IAB node 403, and a terminal 404. Links between respective nodes will be described in more detail. The parent node 401 transmits a backhaul downlink signal to the IAB node 402 in a backhaul downlink $L_{P, DL}$ 411, and the IAB node 402 transmits a backhaul uplink signal to the parent node 401 in a backhaul uplink $L_{P, UL}$ 412. The IAB node 402 transmits an access downlink signal to the terminal 404 in an access downlink $L_{A, DL}$ 416, and the terminal 404 transmits an access uplink signal to the IAB node 402 in an access uplink $L_{A, UL}$ 415. The IAB node 402 transmits a backhaul downlink signal to the child IAB node 403 in a backhaul downlink $L_{C, DL}$ 413, and the child IAB node 403 transmits a backhaul uplink signal to the IAB node 402 in a backhaul uplink $L_{C, UL}$ 414. In the notation, P refers to a backhaul link with the parent, A refers to an access link with the terminal, and C refers to a backhaul link with the child.

Such a link relationship has been described based on the IAB node 402, and from the viewpoint of the child IAB node 403, the parent node may be the IAB node 402, and another child IAB node may exist in a lower layer of the child IAB node 403. Further, from the viewpoint of the parent node 401, the child node may be the IAB node 402, and another parent IAB node may exist in a higher layer of the parent node 401.

As described above, the signals include data and control information, a channel for transmitting the data and control information, a reference signal required to decode the data and control information, or reference signals for knowing the channel information.

In a lower end portion of FIG. 4, schemes for multiplexing the above-described links in a frequency domain or in a space domain are illustrated.

As described above, because the IAB node has the unidirectional transmission/reception characteristics, signals that can be multiplexed in the frequency domain or in the space domain are limited. For example, in consideration of the unidirectional transmission/reception characteristics of the IAB node 402, links that can be multiplexed in the time domain in which the IAB node can transmit are the backhaul uplink ($L_{P, UL}$) 412, the backhaul downlink ($L_{C, DL}$) 413, and the access downlink ($L_{A, DL}$) 416. Accordingly, in the case of multiplexing the above-described links, as denoted as 421, in the frequency domain or the space domain, the IAB node 402 can transmit all the links in the same time domain. Further, links that can be multiplexed in the time domain in which the IAB node can receive are the backhaul downlink ($L_{P, DL}$) 411, the backhaul uplink ($L_{C, UL}$) 414, and the access uplink ($L_{A, UL}$) 415. Accordingly, in the case of multiplexing the above-described links, as denoted as 422, in the frequency domain or the space domain, the IAB node 402 can receive all the links in the same time domain.

The multiplexing of the links provided in the drawing is exemplary, and of course, only two of three links multiplexed in the frequency or space domain may be multiplexed.

Next, a structure of an IAB node according to an embodiment will be described.

In 5G, in order to support various services, such as massive transmission, low-latency and high-reliability, or massive machine-type communication devices, and to reduce communication network installation costs (CAPEX), various types of base station structures that are optimized to service requirements have been researched. In 4G LTE, in order to reduce the CAPEX and to effectively process an interference control, a cloud RAN (C-RAN) structure has been commercialized in which a data processor of a base station and a radio transceiver (or remote radio head (RRH)) are separated from each other, and the data processor performs processing in the center and only the radio transceiver is put in a cell site. In the C-RAN structure, an optical link in the common public radio interface (CPRI) standard is generally used when the base station data processor transmits baseband digital IQ data to the radio transceiver. A large data capacity is required in sending data to the radio transceiver. For example, in the case of sending Internet protocol (IP) data of 10 MHz, 614.4 Mbps is required, and in the case of sending IP data of 20 MHz, a transfer rate of 1.2 Gbps is required. Accordingly, in the 5G RAN structure, in order to reduce a large load on the optical link, the base station has been designed to have various structures by separating the base station into a central unit (CU) and a distributed unit (DU) and applying functional splits to the CU and the DU. In 3GPP, standardization for various functional split options between the CU and the DU has been performed, and 8 functional split options in total, that is, option 1 to option 8, exist to divide functions between protocol layers or in the protocol layers. Among the current 5G base station structures, option 2 and option 7 are preferentially considered. According to option 2, an RRC and a packet data convergence protocol (PDCP) are located in the CU, and a radio link control (RLC), a medium access control (MAC), a physical layer, and a radio frequency (RF) are located in the DU. According to option 7, the RRC, PDCP, RLC, MAC, and higher physical layer are located in the CU, and a lower physical layer is located in the DU. Through the above-described functional split, it is possible to provide a structure having deployment flexibility whereby NR network protocols are separated and moved between the CU and the DU. Through such a structure, the flexible hardware implementation provides a solution having high cost efficiency, the separated structure between the CU and the DU makes it possible to control the load management and real-time performance optimization and makes network functions virtualization (NFV)/software defined network (SDN), and the configurable functional splits can be applied to various application examples (variable latency for transmission).

Accordingly, the structure of an IAB node in consideration of the above-described functional splits will be described using FIG. 5.

Figure 5:
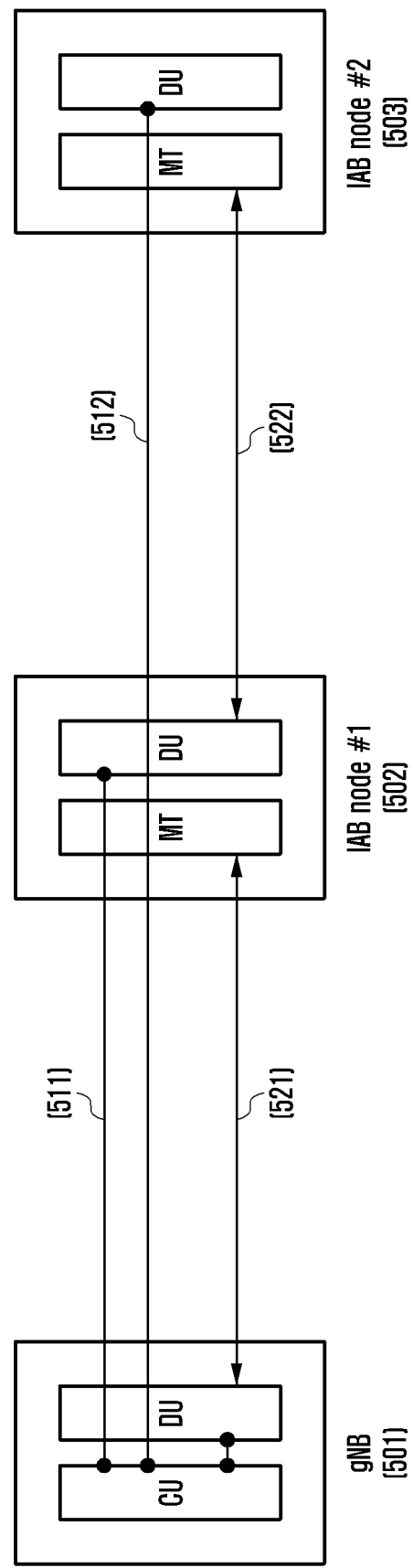
FIG. 5 is a diagram illustrating a structure of an IAB node according to an embodiment of the disclosure.

FIG. 5 is a diagram illustrating a structure of an IAB node according to an embodiment of the disclosure.

Referring to FIG. 5, a gNB 501 is composed of a CU and a DU, and each IAB node is composed of a terminal function (MT) for transmitting and receiving data with a parent node in a backhaul link and a base station function (DU) for transmitting and receiving data with a child node in the backhaul link. In FIG. 5, an IAB node #1 502 is wirelessly connected to the gNB 501 through one hop, and an IAB node #2 503 is wirelessly connected to the gNB 501 through two hops via the IAB node #1 502.

As illustrated in FIG. 5, the CU of the gNB 501 controls not only the DU of the gNB 501 but also DUs of all IAB nodes that are wirelessly connected to the gNB 501, that is, the IAB node #1 502 and the IAB node #2 503 (511 and 512). The CU may allocate a radio resource to the DU so that the DU can transmit or receive data to or from the MT of the IAB node that is in a lower layer thereof. The allocation of the radio resource may be transmitted to the DU through system information, an upper signal, or a physical signal. In this case, the radio resource may be composed of a downlink time resource, an uplink time resource, a flexible time resource, and an always not available time resource (e.g., always not used or always non-available). The downlink time resource is a resource for the DU to transmit downlink control/data and signals to the MT of the IAB node that is in a lower layer thereof. The uplink time resource is a resource for the DU to receive uplink control/data and signals from the MT of the IAB node that is in a lower layer thereof. The flexible time resource is a resource that can be used as the downlink time resource or the uplink time resource by the DU, and how the flexible time resource is to be used may be indicated to the MT of the IAB node that is in a lower layer of the DU through the downlink control signal of the DU. The MT having received the downlink control signal determines whether the flexible time resource is to be used as the downlink time resource or the uplink time resource. If the downlink control signal is not received, the MT does not perform the transmission/reception operation. That is, the MT does not monitor or decode the downlink control channel on the resource, or it does not measure the signal on the resource. The non-used time resource is a resource on which the DU is unable to transmit or receive the data to or from the MT, and it is transmitted to the DU by the CU. On the above-described resource, the MT does not perform the transmission/reception operation. That is, the MT does not monitor or decode the downlink control channel on the resource, or it does not measure the signal on the resource. With respect to the downlink time resource, the uplink time resource, and the flexible time resource, two different types (or three different types including the always not available time resource) may be indicated from the CU to the DU. The first type is a soft type in which the DU can indicate whether the resource is available or is not available to the MT explicitly or implicitly. The second type is a hard type in which the resources are always used between the DU and the MT.

The above-described types are received together when the downlink time resource, the uplink time resource, the flexible time resource, and the reserved time resource are received from the CU to the DU as upper signals.

The DU of the gNB 501 is an ordinary base station, and the DU controls the MT of the IAB node #1 502 to perform scheduling so that the data can be transmitted and received (521). The DU of the IAB node #1 502 is an ordinary base station, and the DU controls the MT of the IAB node #2 503 to perform scheduling so that the data can be transmitted and received (522).

The DU may indicate a radio resource so that the DU can transmit or receive data to or from the MT of the IAB node that is in a lower layer thereof based on the radio resource allocated from the CU. The configuration of the radio resource may be transmitted to the MT through system information, an upper signal, or a physical signal. In this case, the radio resource may be composed of a downlink time resource, an uplink time resource, a flexible time resource, and a reserved time resource. The downlink time resource is a resource for the DU to transmit downlink control/data and signals to the MT of the IAB node that is in the lower layer thereof. The uplink time resource is a resource for the DU to receive the uplink control/data and signals from the MT of the IAB node that is in the lower layer thereof. The flexible time resource is a resource that can be used as the downlink time resource or the uplink time resource by the DU, and how the flexible time resource is to be used may be indicated to the MT of the IAB node that is in a lower layer of the DU through the downlink control signal of the DU. The MT having received the downlink control signal determines whether the flexible time resource is to be used as the downlink time resource or the uplink time resource. If the downlink control signal is not received, the MT does not perform the transmission/reception operation. That is, the MT does not monitor or decode the downlink control channel on the resource, or it does not measure the signal on the resource. The reserved time resource is a resource on which the DU is unable to transmit or receive the data to or from the MT that is in the lower layer thereof, and the MT does not perform the transmission/reception operation on the resource. That is, the MT does not monitor or decode the downlink control channel on the resource, or it does not measure the signal on the resource.

Accordingly, the MT in the IAB nodes is controlled by the DU in the IAB nodes that are in the higher layer thereof to receive the scheduling and to transmit or receive data, and the DU in the IAB nodes is controlled by the CU of the gNB 501, so that the MT and the DU in one IAB are controlled by different subjects, which causes real-time coordination thereof to be difficult.

Figure 6:
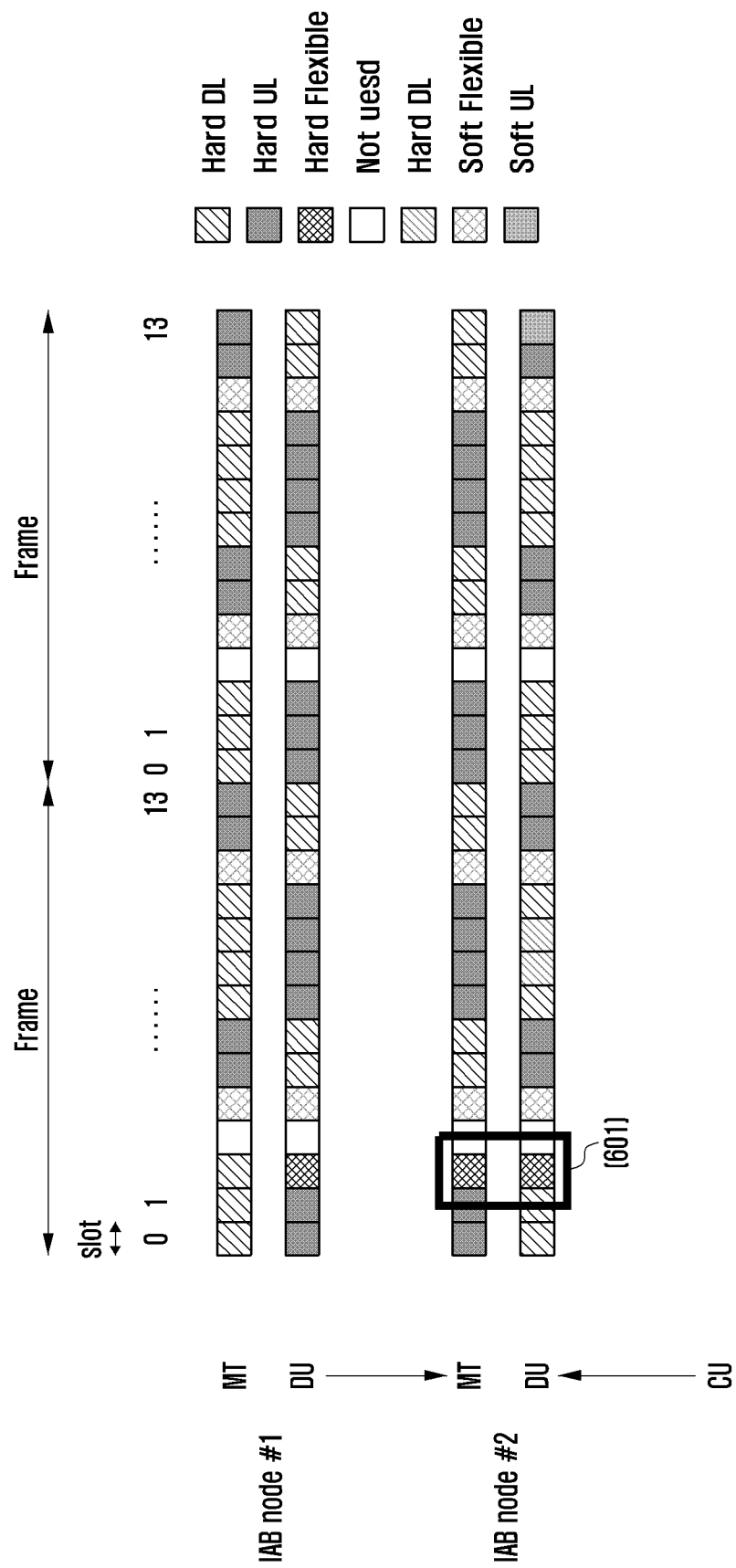
FIG. 6 is a diagram illustrating a problem occurring in a case where dynamic resource allocation for an IAB is applied according to an embodiment of the disclosure.

FIG. 6 is a diagram illustrating a problem occurring in a case where dynamic resource allocation for an IAB is applied according to an embodiment of the disclosure.

Referring to FIG. 6, a situation is illustrated in which the DU of an IAB node #1 indicates the above-described resources to the MT of an IAB node #2 as described above with reference to FIG. 5, and the CU of the gNB as shown in FIG. 5 indicates resource allocation to the DU of the IAB node #2. In this case, as denoted as 601 in FIG. 6, in a situation in which both the DU and the MT of the IAB node #2 are indicated as the same time resource as the flexible time resource, the MT of the IAB node #2 determines the flexible time resource as the downlink time resource or the uplink time resource in accordance with the indication of the DU of the IAB node #1. If the MT of the IAB node #2 determines the corresponding flexible time resource as the downlink time resource in accordance with the scheduling, it may receive the downlink control/data channel and the reference signal, whereas if it determines the flexible time resource as the uplink time resource, it may transmit the uplink control/data channel and the reference signal. In contrast, although not illustrated in FIG. 6, the DU of the IAB node #2 may instruct the MT of the lower IAB node to determine the flexible time resource as the uplink time resource and to transmit the uplink control/data channel and the reference signal, or it may instruct the MT of the IAB node to determine the downlink time resource and to receive the downlink control/data channel and the reference signal.

Accordingly, the MT and the DU of the IAB node #2 may respectively determine and perform the transmission/reception on the flexible time resource in accordance with the indication of the DU of the IAB node #1 and the determination of the DU of the IAB node #2. In this case, the unidirectional transmission/reception characteristics of the IAB node may not be satisfied. For example, the MT of the IAB node #2 may determine the flexible time resource as the downlink time resource in accordance with the indication of the DU of the IAB node #1 to receive the downlink control/data channel and the reference signal, and at the same time, the DU of the IAB node #2 may determine the flexible time resource as the downlink time resource to transmit the downlink control/data channel and the reference signal. Accordingly, if it is required that the MT of the IAB node #2 should perform reception and the DU should perform transmission, the unidirectional transmission/reception characteristics cannot be satisfied.

Accordingly, in the disclosure, schemes for transmitting or receiving data of a backhaul link as satisfying the unidirectional transmission/reception characteristics of the IAB node when transmission and reception of the MT and the DU in one IAB node collide with each other are provided through the following embodiments.

Embodiment 1

As a first embodiment, if the DU of the IAB node #1 in FIG. 6 is allocated with a specific time resource as a soft type from the CU, and the time resource is not used by the DU of the IAB node #1 that is the parent IAB node in FIG. 6 and thus the MT of the IAB node #2 in FIG. 6 determines that the time resource is not used for the transmission and reception, the IAB node #2 may transmit and receive data in consideration of the DU only. That is, for the unidirectional transmission/reception characteristics, the IAB node #2 may perform the transmission/reception of the DU of the IAB node #2 without considering the transmission/reception of the MT of the IAB node #2. That is, the IAB node #2 may consider the transmission/reception of the DU before the transmission/reception of the MT.

Further, if the DU of the IAB node #2 in FIG. 6 is allocated with a specific time resource as a soft type from the CU, and although not illustrated in FIG. 6, the DU of the IAB node #2 instructs the MT of the child IAB node not to use the time resource explicitly or implicitly, the data can be transmitted or received in consideration of the MT of the IAB node #2 only. That is, for the unidirectional transmission/reception characteristics, the transmission/reception of the MT of the IAB node #2 can be performed as the scheduling of the DU of the IAB node #1 without considering the transmission/reception of the DU of the IAB node #2.

Embodiment 2

A second embodiment may be applied if the following conditions are satisfied.

(Condition 1) The DU of the IAB node #1 in FIG. 6 is allocated with a specific time resource as a soft type from the CU, and the MT of the IAB node #2 determines that the time resource is used for the transmission/reception as the DU of the IAB node #1. That is, the parent IAB node instructs the MT of the IAB node #2 of FIG. 6 to use the time resource explicitly or implicitly, or the DU of the IAB node #1 is allocated with the specific time resource as a hard type from the CU.

(Condition 2) The DU of the IAB node #2 in FIG. 6 is allocated with a specific time resource as a soft type from the CU, and although not illustrated in FIG. 6, the DU of the IAB node #2 instructs the MT of the child IAB node to use the time resource explicitly or implicitly, or the DU of the IAB node #2 is allocated with the specific time resource as a hard type from the CU.

If the IAB node #2 determines that the condition 1 and the condition 2 are simultaneously satisfied, the IAB node #2 may simultaneously receive the DU and the MT of the IAB node #2 on the time resource only in the case where the MT of the IAB node #2 is in a reception state and the DU of the IAB node #2 is in a reception state, or the IAB node #2 may simultaneously transmit the DU and the MT of the IAB node #2 on the time resource only in the case where the MT of the IAB node #2 is in a transmission state and the DU of the IAB node #2 is in a transmission state.

If the IAB node #2 determines that the condition 1 and the condition 2 are simultaneously satisfied, the IAB node #2 performs only transmission/reception of one of the DU and the MT in accordance with the unidirectional transmission/reception characteristics of the IAB node in the case where the MT of the IAB node #2 is in a transmission state and the DU of the IAB node #2 is in a reception state, or in the case where the MT of the IAB node #2 is in a reception state and the DU of the IAB node #2 is in a transmission state. As a method for performing only one transmission/reception, embodiment 3 below may be applied.

Embodiment 3

In embodiment 3, the IAB node determines whether transmission/reception of the DU or the MT takes precedence based on a priority rule. That is, as described above with reference to FIG. 6, if it is required to simultaneously perform the transmission/reception of the DU or the MT in one IAB node, the IAB node determines of what link the transmission power or transmission takes precedence based on the transmission channel or transmission information of the DU or the MT. For example, the priority rule of the transmission channel or transmission information may be determined as follows.

First priority: A synchronization signal or CSI-RS transmitted for discovery of a tracking reference signal (TRS) for phase estimation of the synchronization signal or channel or IAB nodes Second priority: Uplink control information including hybrid automatic repeat request-acknowledge (HARQ-ACK)

Third priority: Uplink data channel including HARQ-ACK

Fourth priority: Downlink control information, downlink data information, and CSI-RS As described above, the first priority corresponds to channels or information having the highest priority, and importance becomes reduced as the priority goes from high to low. The above-described priority rule is exemplary, and it may be differently determined what information or channel takes precedence and the above-described transmission priorities may be determined in the standard. For example, taking precedence means that a transmission power is first given or is always transmitted in the case where the transmission power is limited. In contrast, taking no precedence means that the transmission power is reduced or the transmission is dropped as compared with the high priority in the case where the transmission power is limited.

The above-described transmission channel or transmission information may include a channel or information that can be transmitted from a backhaul uplink (e.g., $L_{P,\ UL}$ 412), a backhaul downlink (e.g., $L_{C,\ DL}$ 413), and an access downlink (e.g., $L_{A,\ DL}$ 416), and if the same channel or information is transmitted from two different links, a backhaul link may take precedence, or an access link may take precedence. Further, the transmission waveforms of the above-described links may be configured as cyclic prefix (CP)-OFDM or discrete Fourier transform spread (DFT-S)-OFDM through an upper signal or X2 signaling. As described above, if the two different links are transmitted with different waveforms, the DFT-S-OFDM may take precedence to the CP-OFDM.

Based on the above-described rule, the link including the high-priority channel or information is preferentially transmitted or received to or from the MT or the DU of the IAB node from the viewpoint of the transmission power or transmission, and other DUs or MTs having not been transmitted or received drop the transmission/reception.

Further, as another priority rule, transmission/reception with the parent IAB node may always take precedence. That is, the MT of one IAB node may take precedence. In this case, the DU of the IAB node should drop the transmission/reception with the MT of the child IAB node, or should avoid the same by scheduling.

Further, as another priority rule, transmission/reception with the child IAB node may always take precedence. That is, the DU of one IAB node may take precedence. In this case, the MT of the IAB node should drop the transmission/reception by scheduling or instructions by the DU of the parent IAB node.

Figure 7:
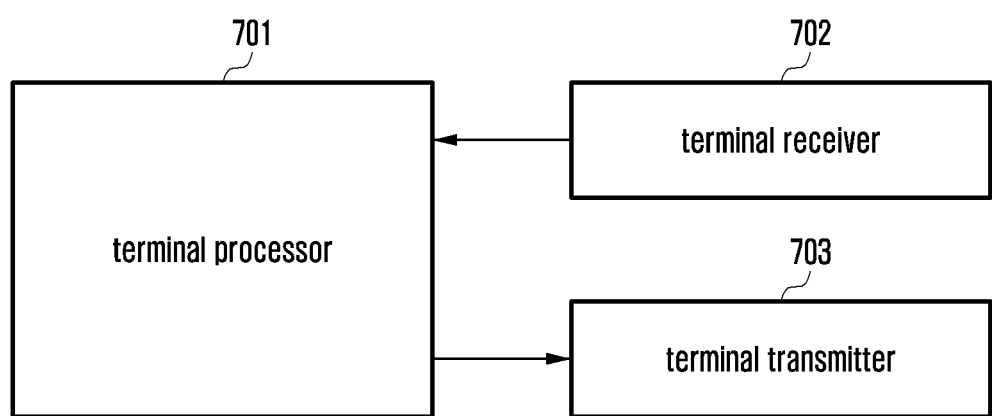
FIG. 7 is a diagram illustrating a terminal device according to an embodiment of the disclosure.
Figure 8:
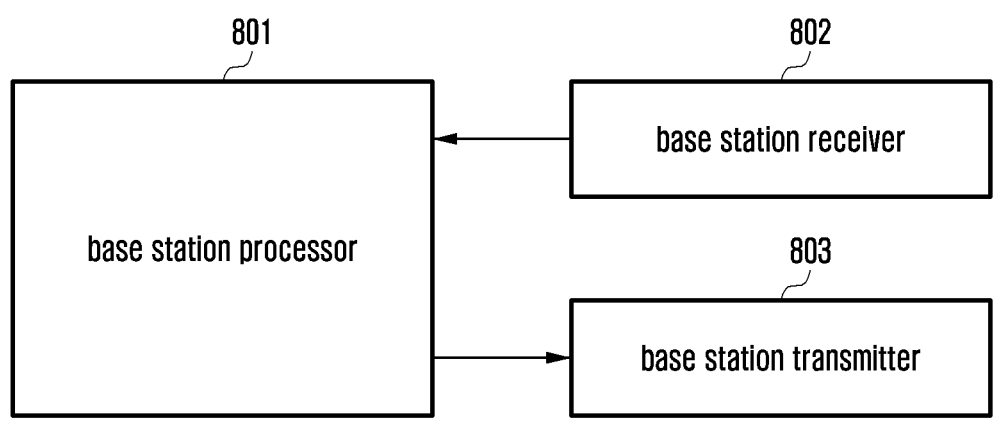
FIG. 8 is a diagram illustrating a base station device according to an embodiment of the disclosure.
Figure 9:
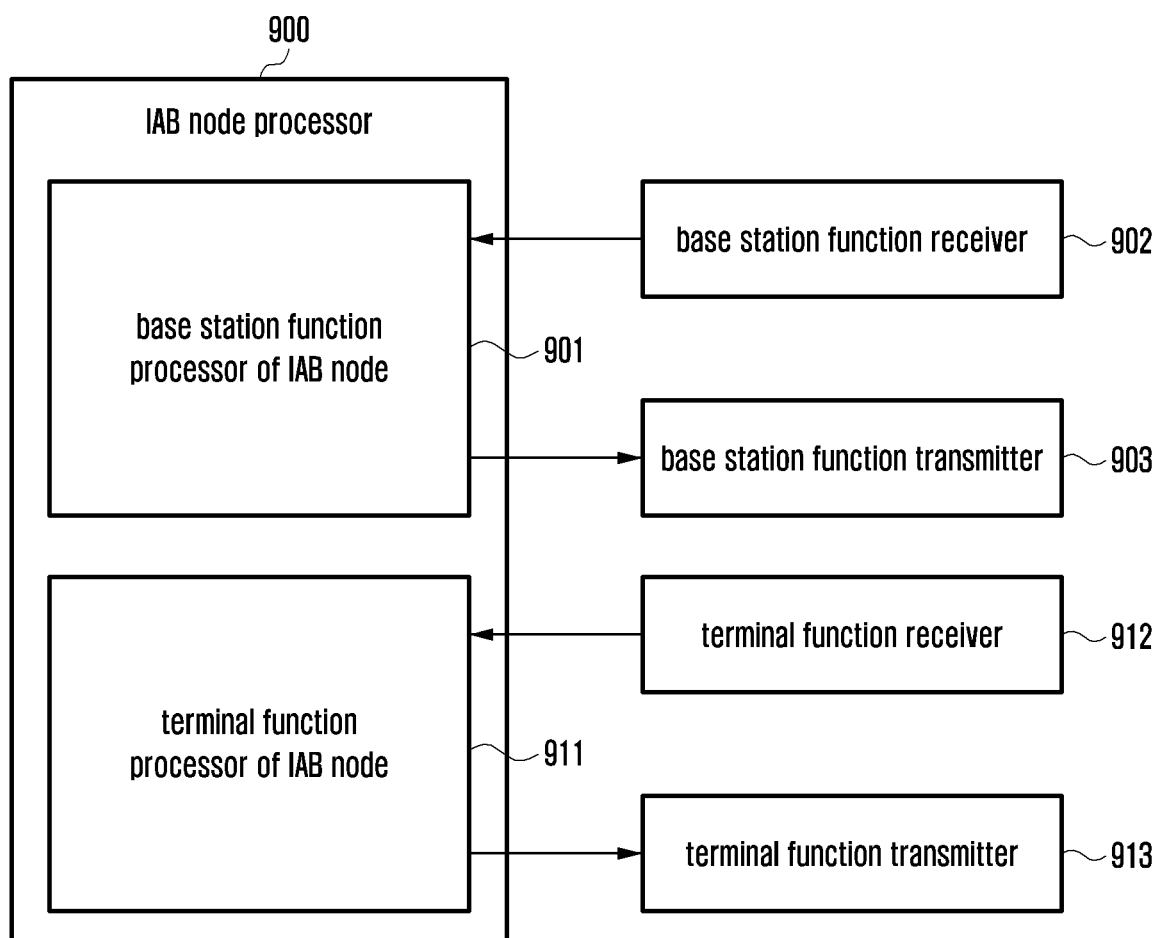
FIG. 9 is a diagram illustrating a device of an IAB node according to an embodiment of the disclosure.

In order to perform the above-described embodiments of the disclosure, transmitters, receivers, and controllers of a terminal and a base station are illustrated in FIGS. 7 and 8. Further, FIG. 9 illustrates a device of an IAB node. In the case of transmitting or receiving a backhaul link or an access link through an IAB node in a 5G communication system corresponding to the above-described embodiments, transmission and reception methods by a base station (e.g., donor base station) transmitting or receiving the backhaul link with the IAB node through the mmWave and a terminal transmitting or receiving the access link with the IAB node are provided, and in order to perform the methods, the transmitters, receivers, and processors of the base station, the terminal, and the IAB node should operate in accordance with the respective embodiments.

FIG. 7 is a diagram illustrating a terminal device according to an embodiment of the disclosure.

Referring to FIG. 7, a terminal according to the disclosure may include a terminal controller 701, a terminal receiver 702, and a terminal transmitter 703.

The terminal controller 701 may control a series of processes in which the terminal can operate according to an embodiment of the disclosure. For example, the terminal controller 701 may differently control access link transmission and reception with the IAB node according to an embodiment of the disclosure. In an embodiment of the disclosure, the terminal receiver 702 and the terminal transmitter 703 may be commonly called a transceiver. The transceiver may transmit or receive a signal to or from a base station. The signal may include control information and data. For this, the transceiver may include an RF transmitter up-converting and amplifying the frequency of a transmitted signal, and an RF receiver low-noise-amplifying the received signal and down-converting the frequency of the amplified signal. Further, the transceiver may receive the signal on a radio channel, output the signal to the terminal controller 701, and transmit the signal output from the terminal controller 701 through the radio channel.

FIG. 8 is a diagram illustrating a base station device according to an embodiment of the disclosure.

Referring to FIG. 8, a base station according to the disclosure may include a base station controller 801, a base station receiver 802, and a base station transmitter 803.

The base station controller 801 may control a series of processes in which the base station can operate according to an embodiment of the disclosure. For example, the base station controller 801 may differently control backhaul link transmission and reception and access link transmission and reception with the IAB node according to an embodiment of the disclosure. In an embodiment of the disclosure, the base station receiver 802 and the base station transmitter 803 may be commonly called a transceiver. The transceiver may transmit or receive a signal to or from a terminal. The signal may include control information and data. For this, the transceiver may include an RF transmitter up-converting and amplifying the frequency of a transmitted signal, and an RF receiver low-noise-amplifying the received signal and down-converting the frequency of the amplified signal. Further, the transceiver may receive the signal on a radio channel, output the signal to the base station controller 801, and transmit the signal output from the base station controller 801 through the radio channel.

FIG. 9 is a diagram illustrating a device of an IAB node according to an embodiment of the disclosure.

Referring to FIG. 9, an IAB node according to the disclosure may include a base station function controller 901 of the IAB node for transmission/reception to a lower IAB node and a backhaul link, a base station function receiver 902, and a base station function transmitter 903. Further, the IAB node may include a terminal function controller 911 of the IAB node for initially accessing a higher IAB node and a donor base station, performing upper signal transmission/reception before the transmission/reception to the backhaul link, and transmitting or receiving the backhaul link to or from the higher IAB node and the donor base station, a terminal function receiver 912, and a terminal function transmitter 913.

The base station function controller 901 of the IAB node may control a series of processes in which the IAB node can operate with the base station according to an embodiment of the disclosure, and for example, the base station function controller 901 may perform the function of a DU of the IAB node as described above. For example, the base station function controller 901 may differently control backhaul link transmission and reception with a lower IAB node and access link transmission and reception with the terminal according to an embodiment of the disclosure. In an embodiment of the disclosure, the base station function receiver 902 and the base station function transmitter 903 may be commonly called a transceiver. The transceiver may transmit or receive a signal to or from the lower IAB node and a terminal. The signal may include control information and data. For this, the transceiver may include an RF transmitter for up-converting and amplifying the frequency of a transmitted signal, and an RF receiver for low-noise-amplifying the received signal and down-converting the frequency of the amplified signal. Further, the transceiver may receive the signal on a radio channel, output the signal to the base station function controller 901, and transmit the signal output from the base station function controller 901 through the radio channel.

The terminal function controller 911 of the IAB node may control a series of processes in which the lower IAB node can operate with the terminal for data transmission/reception with the donor base station or the higher IAB node according to an embodiment of the disclosure, and for example, the terminal function controller 911 may perform the function of an MT of the IAB node as described above. For example, the terminal function controller 911 may differently control backhaul link transmission and reception with the donor base station and the higher IAB node according to an embodiment of the disclosure. In an embodiment of the disclosure, the terminal function receiver 912 and the terminal function transmitter 913 may be commonly called a transceiver. The transceiver may transmit or receive a signal to or from the donor base station and the higher IAB node. The signal may include control information and data. For this, the transceiver may include an RF transmitter up-converting and amplifying the frequency of a transmitted signal, and an RF receiver low-noise-amplifying the received signal and down-converting the frequency of the amplified signal. Further, the transceiver may receive the signal on a radio channel, output the signal to the terminal function controller 911, and transmit the signal output from the terminal function controller 911 through the radio channel.

The base station function controller 901 of the IAB node included in the IAB node of FIG. 9 and the terminal function controller 911 of the IAB node may be integrated to be implemented as an IAB node controller 900. In this case, the IAB node controller 900 can control both the functions of the DU and the MT in the IAB node.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an integrated access and backhaul (IAB) node including a distributed unit (DU) and a mobile termination (MT) in a wireless communication system, the method comprising:
receiving, by the DU, from a central unit (CU) of a base station, a message scheduling a resource for the DU, the message including a configuration indicating a type for each symbol of the resource to be hard, soft or unavailable;
identifying, by the DU, whether a type for a symbol of a slot is configured to be hard based on the message; and
performing, by the DU, a transmission or a reception in the symbol, in case that the type for the symbol is configured to be hard,
wherein a slot format of the slot includes at least one of downlink symbols, uplink symbols, or flexible symbols, and
wherein the transmission is performed in the downlink symbols, the reception is performed in the uplink symbols, and the transmission or the reception is performed in the flexible symbols.

2. The method of claim 1,
wherein the transmission of the DU includes a transmission to a terminal or a next-hop IAB node, and
wherein the reception of the DU includes a reception from the terminal or the next-hop IAB node.

3. The method of claim 1, wherein a transmission or a reception of the MT is not performed in the symbol for which the type is configured to be hard.

4. The method of claim 1,
wherein the transmission or the reception of the DU has higher priority than a transmission or a reception of the MT for the symbol for which the type is configured to be hard, and
wherein the transmission or the reception of the MT is dropped in the symbol.

5. The method of claim 1, wherein the transmission or the reception of the DU is performed in accordance with a half-duplex constraint of the IAB node.

6. An integrated access and backhaul (IAB) node in a wireless communication system, the IAB node comprising:
a mobile termination (MT); and
a distributed unit (DU),
wherein the DU is configured to:
receive, from a central unit (CU) of a base station, a message scheduling a resource for the DU, the message including a configuration indicating a type for each symbol of the resource to be hard, soft or unavailable,
identify whether a type for a symbol of a slot is configured to be hard based on the message, and
perform a transmission or a reception in the symbol, in case that the type for the symbol is configured to be hard,
wherein a slot format of the slot includes at least one of downlink symbols, uplink symbols, or flexible symbols, and
wherein the transmission is performed in the downlink symbols, the reception is performed in the uplink symbols, and the transmission or the reception is performed in the flexible symbols.

7. The IAB node of claim 6,
wherein the transmission of the DU includes a data transmission to a terminal or a next-hop IAB node, and
wherein the reception of the DU includes a reception from the terminal or the next-hop IAB node.

8. The IAB node of claim 6, wherein a transmission or a reception of the MT is not performed in the symbol for which the type is configured to be hard.

9. The IAB node of claim 6,
wherein the transmission or the reception of the DU has higher priority than a transmission or a reception of the MT for the symbol for which the type is configured to be hard, and
wherein the transmission or the reception of the MT is dropped in the symbol.

10. The IAB node of claim 6, wherein the transmission or the reception of the DU is performed in accordance with a half-duplex constraint of the IAB node.

11. A method performed by a base station including a central unit (CU) in a wireless communication system, the method comprising:
transmitting, to a distributed unit (DU) of an integrated access and backhaul (IAB) node including the DU and a mobile termination (MT), a message scheduling a resource for the DU, the message including a configuration indicating a type for each symbol of the resource to be hard, soft, or unavailable,
wherein a transmission or a reception of the DU is performed in a symbol of a slot for which a type is configured to be hard,
wherein a slot format of the slot includes at least one of downlink symbols, uplink symbols, or flexible symbols, and
wherein the transmission of the DU is performed in the downlink symbols, the reception of the DU is performed in the uplink symbols, and the transmission or the reception of the DU is performed in the flexible symbols.

12. The method of claim 11,
wherein the transmission of the DU includes a transmission to a terminal or a next-hop IAB node, and
wherein the reception of the DU includes a reception from the terminal or the next-hop IAB node.

13. The method of claim 11, wherein a transmission or a reception of the MT is not performed in the symbol for which the type is configured to be hard.

14. The method of claim 11,
wherein the transmission or the reception of the DU has higher priority than a transmission or a reception of the MT for the symbol for which the type is configured to be hard, and
wherein the transmission or the reception of the MT is dropped in the symbol.

15. The method of claim 11, wherein the transmission or the reception of the DU is performed in accordance with a half-duplex constraint of the IAB node.

16. A base station in a wireless communication system, the base station comprising:
- a central unit (CU) configured to transmit, to a distributed unit (DU) of an integrated access and backhaul (IAB) node including the DU and a mobile termination (MT), a message scheduling a resource for the DU, the message including a configuration indicating a type for each symbol of the resource to be hard, soft, or unavailable,
- wherein a transmission or a reception of the DU is performed in a symbol of a slot for which a type is configured to be hard,
- wherein a slot format of the slot includes at least one of downlink symbols, uplink symbols, or flexible symbols, and
- wherein the transmission of the DU is performed in the downlink symbols, the reception of the DU is performed in the uplink symbols, and the transmission or the reception of the DU is performed in the flexible symbols.

17. The base station of claim 16,
- wherein the transmission of the DU includes a transmission to a terminal or a next-hop IAB node, and
- wherein the reception of the DU includes a reception from the terminal or the next-hop IAB node.

18. The base station of claim 16, wherein a transmission or a reception of the MT is not performed in the symbol for which the type is configured to be hard.

19. The base station of claim 16,
- wherein the transmission or the reception of the DU has higher priority than a transmission or a reception of the MT for the symbol for which the type is configured to be hard, and
- wherein the transmission or the reception of the MT is dropped in the symbol.

20. The base station of claim 16, wherein the transmission or the reception of the DU is performed in accordance with a half-duplex constraint of the IAB node.

* * * * *